(12) United States Patent
De Winter et al.

(10) Patent No.: US 6,773,736 B1
(45) Date of Patent: Aug. 10, 2004

(54) METHOD FOR TREATING PRODUCTS BY HIGH VOLTAGE PULSES

(75) Inventors: Edwin Johannus Gerardus De Winter, Culemborg (NL); Hendrikus Cornelis Mastwijk, Bilthoven (NL); Paul Vincent Bartels, Wageningen (NL)

(73) Assignee: Ato B.V., Wageningen (NL)

( * ) Notice: Subject to any disclaimer, the term of this patent is extended or adjusted under 35 U.S.C. 154(b) by 0 days.

(21) Appl. No.: 09/937,349

(22) PCT Filed: Mar. 24, 2000

(86) PCT No.: PCT/NL00/00200

§ 371 (c)(1),
(2), (4) Date: Sep. 24, 2001

(87) PCT Pub. No.: WO00/56179

PCT Pub. Date: Sep. 28, 2000

(30) Foreign Application Priority Data

Mar. 24, 1999 (NL) ............................................. 1011660

(51) Int. Cl.$^7$ ................................................. A23L 3/005
(52) U.S. Cl. ...................................... 426/244; 426/521
(58) Field of Search ................................. 426/237, 238, 426/244, 407, 521; 99/451, 483, DIG. 14

(56) References Cited

U.S. PATENT DOCUMENTS

| | | | |
|---|---|---|---|
| 4,320,276 A | * 3/1982 | Takeuchi et al. ............ 426/244 |
| 4,417,132 A | * 11/1983 | Simpson .................... 426/244 |
| 4,695,472 A | 9/1987 | Dunn et al. | |
| 4,838,154 A | 6/1989 | Dunn et al. | |
| 5,235,905 A | 8/1993 | Bushnell et al. | |
| 5,447,733 A | 9/1995 | Bushnell et al. | |
| 5,514,391 A | 5/1996 | Bushnell et al. | |
| 5,549,041 A | 8/1996 | Zhang et al. | |
| 5,690,978 A | 11/1997 | Yin et al. | |
| 5,776,529 A | 7/1998 | Qin et al. | |
| 6,027,754 A | 2/2000 | Bushnell et al. | |

FOREIGN PATENT DOCUMENTS

| WO | WO 93/25097 | 12/1993 |
| WO | WO 96/38045 | 12/1996 |

OTHER PUBLICATIONS

Lubiki et al., XP–000546877, "Inactivation of Yersinia Enterocolitica Gram–Negative Bacteria Using High Voltage Pulse Technique", vol. 2, pps. 1338–1344, 10/95.
Qin et al., XP–000766888, "Inactivating Microorganisms Using a Pulsed Electric Field Continuous Treatment System", vol. 34, pps. 43–49, 02–98.

* cited by examiner

Primary Examiner—George C. Yeung
(74) Attorney, Agent, or Firm—Young & Thompson

(57) ABSTRACT

The invention relates to a method for treating products, which may contain cellular material of eukaryotic and/or prokaryotic origin and in particular micro-organisms, by bringing the product in device comprising two electrodes connected to an electronic circuit such that in said device and in said product a pulsating electrical field is created, characterized by the rise time of each imposed voltage pulse which is less than the electronic relaxation time of the product. Preferably the rising edge of each cycle starts within the relaxation time of the product and even more preferably each electrical field pulse has a duration shorter than the relaxation time of the product. Dependent on the type of product and the types of micro-organisms contained in the product, the maximum fieldstrength of each pulse, the repetition frequency and the number of cycles in the treatment are selected such that the target micro-organisms and/or spores are functionally inactivated leading to a shelf stable, microbiologically safe product.

7 Claims, 1 Drawing Sheet

METHOD FOR TREATING PRODUCTS BY HIGH VOLTAGE PULSES

CROSS REFERENCE TO RELATED APPLICATION

This is the 35 USC 371 national stage of International Application PCT/NL00/00200 filed on March 24, 2000, which designated the United States of America.

FIELD OF THE INVENTION

The invention relates to a method for treating products, which may contain cellular material of eukaryotic and or prokaryotic origin, in particular micro-organisms, located in a device comprising two electrodes onto where voltage cycles are imposed by an auxiliary electric source such that in the device and in the product electrical fields are created for a short period of time.

A prior art method of this type is known as the Pulsed Electric Field (PEF) process.

BACKGROUND OF THE INVENTION

Many biological systems, such as micro-organisms, comprise a cell membrane to regulate its energy balance. Cell membranes consist of a lipid double layer whereby the lipids are made of a polar head and a fatty acid tail. Metabolic processes are regulated by said cell membrane. Physical damage of the cell membrane may lead to inactivation of the system or to an increase of the exchange of mass transport through the membrane such as inter-cellular material and/or compounds present in the bulk of the product. In the case of micro-organisms damage to the cell membrane may lead to inactivation of the organism such that the cell division process will be interrupted or its functional abilities to produce metabolic compounds is affected Damage to the cell membrane of micro-organisms may be caused by bringing the micro-organisms into a high electric field. An sufficiently high externally imposed potential difference across the micro-organism is believed to lead to damage of the cell membrane as it leads to the inactivation of the micro-organisms as such. A treatment based on PEF can performed by using a pulsed DC voltage source. The above mentioned PEF process relies on the use of high voltage pulses to generate a pulsating electric field of in a product of such a short duration that the heating of the bulk product is restricted.

A very simple system in which the PEF-method is applied is described in U.S. Pat. Nos. 5,393,541 and 5,447,733. Both related publications illustrate a system comprising a container which is filled by product to be treated and a metal electrode which is lowered into the container. The container itself forms the other electrode and both electrodes are connected to a power supply delivering pulses of at 2 kV or more with a duration of typically two microseconds.

Another embodiment of a chamber for treating fluid products according to the PEF-method is described in U.S. Pat. Nos. 4,695,472 and 4,838,154. In this embodiment two flat electrodes are positioned opposite each other with a flow channel in between. Both electrodes are connected to a power source which during operation generates pulses. In this configuration a pulsed electrical field is produced within the product inside the channel in agreement with the PEF-method. As described, in both patents the product is subjected to high electric field pulses each having a minimum field strength of at least 5 kV/cm and each having a duration of at least about one micro-second. Preferably a duration in the range from about 5 to about 100 micro-seconds.

A further example of a system in which a PEF-method is performed is described in U.S. Pat. Nos. 5,235,905, 5,776, 529 and an article with the title "Inactivating Microorganisms Using a Pulsed Electric Field Continuous Treatment System" by Bai-Lin Qin published in IEEE Transactions on Industrial Applications, Volume 34, nr. 1, 1 February 1998, pages 43/49. This prior art system comprises a socalled coaxial treatment chamber. During operation electrical pulses are supplied to both electrodes such that electrical field strengths in the range of 35 to 55 kV/cm are developed. Preferred pulse duration's are less than 100 milliseconds, more preferably in the range of 0.1 to 100 microseconds and even more preferably in the range of approximately 0.2 to 10 micro-seconds.

A system comprising a series of tubular treatment chambers is described in U.S. Pat. No. 5,690,978. Each chamber has electrically conducting end-sections, which act as electrodes separated by a non-conducting intermediate section. During operation a pulsed electric field is developed in the treatment chamber with a typical pulse duration time of three microseconds at an applied electric field strength of E=30 kV/cm whereas the temperature reaches a maximum T=36° C.

In all these prior art systems the medium to be treated has to be in physical and electrical contact with both the electrodes during the treatment.

A different mode of treatment is described in an article with the title "Inactivation of Yersinia enterocolitica Gram-Negative Bacteria using high voltage pulse technique" by Piotr, Lubicki et al published as record of the industry application conference (IAS, Orlando, Oct. 9/12, 1995, Volume 2, Number 30, pages 1338–1344, Institute of Electrical and Electronics Engineers ISBN 0-7803-3009/9, page 1339, column 1, lines 3–24). In this article a treatment device is described comprising a cylindrical electrode system including a rod shaped inner electrode inside a cylindrically shaped outer electrode. The inner electrode is connected to a source of high voltage pulses and the outer electrode is electrically grounded. The product to be treated is contained between both electrodes in a helical shaped glass tube and the remaining space within the electrode system is filled with water.

During operation a pulsed electrical field is developed between the electrodes where the rise time of each pulse is between 500 and 1300 nanoseconds and the voltage has a peak value equal to 45, 60 or even 75 kV. The article, however, does not provide any information about the electrical field strength within the product to be treated nor the processing temperatures of the product. In the article it is stressed that "in order to cause electroporation of a cell membrane, the voltage magnitude must be high enough to induce suitable value of transmembrane potential for breakdown of the membrane, and at the same time, duration of the voltage pulse must be at least higher then the relaxation time of a bacteria suspension". The product to be treated in the described model is a solution of NaCl in water for which $\in=0.7$ nF/m with an electrical conductivity between 0.8 and 1.2 S/m. The relaxation time is therefore between 0.6 and 0.9 nanoseconds. In other words, the above mentioned rise time of 500 to 1300 ns is indeed significantly larger than the relaxation time of the product to be treated. It is furthermore indicated that "there is no remarkable effect of increasing rise time within the range of 500 to 1300 ns".

OBJECT OF THE INVENTION

An objective of the invention is now to provide another method for treating suitable products, which may contain micro-organisms by developing pulsed electrical fields within the product by a different coupling. More specific it is an objective of the invention to provide a method for mild preservation of products where direct contact between the product and the electrodes is not required and where a different phenomenon is exploited to produce a substantial electrical field inside a product.

THE INVENTION

In agreement with these objectives, the invention now provides a method for treating products by bringing the product into a treatment device containing two electrodes onto which a rapidly changing high voltage difference is imposed. The two electrodes are connected to an electronic circuitry such that the device and the product are subjected to a time dependent voltage. The time dependence of the imposed voltage is primairily characterised by the rise time of the voltage which is in duration shorter than the so-called relaxation time of the product. The relaxation time has to be understood as the time necessary to obtain a complete separation of charges in a product from the moment an external voltage difference is induced over a product column. The charges in a food product may be the result of a mineral salt content of e.g. NaCl or KCl. In foodstuffs of sufficiently high water content the NaCl molecules are dissolved as Na+ and Cl- ions. The relaxation time can be expressed as $\tau = \in/\sigma$ whereby $\sigma$ is the electrical conductivity of the fluid and $\in$ is the dielectric constant or permittivity.

Dynamical Polarisation Process

This method according to the invention, called the Dynamic Polarisation Process or DPP method, is based on the insight that foodstuffs and bio-mass in general are neither not very good conductors nor insulators. Typically, the electrical conductivity of high water content foodstuffs range from 0.1 S/m to 10 S/m and the permittivity is close to the permittivity of water i.e. 0.71 nF/m. As a result, a product column that is initially polarised by an external imposed voltage difference, will lose its polarisation after 0.07 to 7 nanoseconds. In this application this impulse response is exploited as follows: if an electrical voltage is imposed sufficiently fast by means of an external source, an electrical field will be present inside the product for a duration equal to the relaxation time. As soon as a predetermined maximum peak amplitude is obtained, the external imposed voltage is allowed to vanish. Thus, it is only necessary to reach a maximum required voltage in order to induce a voltage gradient within a product for a certain period of time. The treatment can be applied several times by allowing more cycles as described previously. The level of the required voltage difference needed (or electrical field strength) in a particular application depends on the type of bulk medium, the micro-organisms under consideration and the number of cycles. Note, that micro-organisms that are present in the product will be affected by the voltages cycles as well. As the dynamical polarisation process is distinctly different from the PEF process, the interaction with organisms is of a different origin. As no charge is displaced in case of DPP and the coupling to the product is capacitive the inactivation of rigid micro structures as bacterial spores may be possible as well.

It is preferred that the described DPP method is performed under circumstances whereby the trailing edge of each pulse has ended within the relaxation time of the product. Under these circumstances any electrical current due to movement of charges is prevented even if there is a physical and or electrical contact between the electrodes and the product. In general, the DPP process can be applied e.g. in continuous flow where product is pumped through a device in which treatment takes place during its residence. Product preparation, treatment and after handling of foodstuffs, pharmaceuticals etc. can be are similar to systems where heat pasteurisation/sterilisation or PEF treatment are applied in continuous flow. The exception is that treatment is employed at DPP conditions.

In case of batch operation it is preferred that there is no direct contact between the electrodes and the product. In this case the electrodes in a treatment device can be the plates of a capacitor configuration and the product just has to be present between said plates. In such a embodiment of the method, the product is not confined to a specific tube, channel etc. defined by the treatment device itself but the product is present e.g. within a suitable package which is placed into the device. Examples of products that may be treated in batch are pouches, boxes, containers but also complete eggs in shell. These products can be treated in a (semi-) continuously fashion. For this an controlled automated system may be used comprising a conveyor belt and a treatment device which is connected to suitable electronic source to apply the DPP method.

BRIEF DESCRIPTION OF THE DRAWINGS

In the following part of this specification the invention will be described in more detail with reference to the attached drawings.

DETAIL DESCRIPTION OF THE INVENTION

Figure 1A:
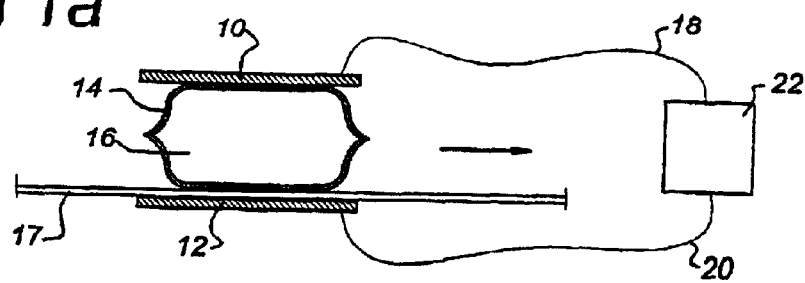
FIG. 1a illustrates a first embodiment of a semi-continuous or batch operated device for performing the method according to the invention.

The apparatus in FIG. 1a comprises two electrically conducting plates, 10 and 12, which together form a capacitor configuration. Both plates are connected through the respective wires 18 and 20 to an electrical power source 22. Between the plates a packed product 14 is positioned. Typically, the packaging material is made out of electrical insultaing material e.g. plastic, glass or carton which contains the product to be treated.

Figure 1B:
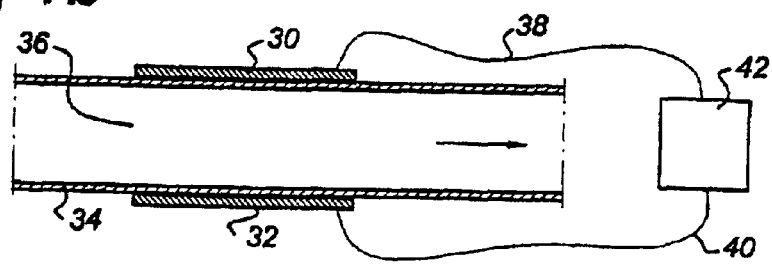
FIG. 1b illustrates a second embodiment of a device for performing the method according to the invention in continuous flow.

The apparatus in FIG. 1b comprises two electrically conducting plates, 30 and 32, which configure a capacitor configuration. Both plates are connected through the respective wires 38 and 40 to an electrical power source 42. Between the plates a conduit 34 is installed through which the product is treated in continuous flow. Typically, the conduit is made out of electrical insulating material. This conduit is part of the treatment device.

Figure 2A:
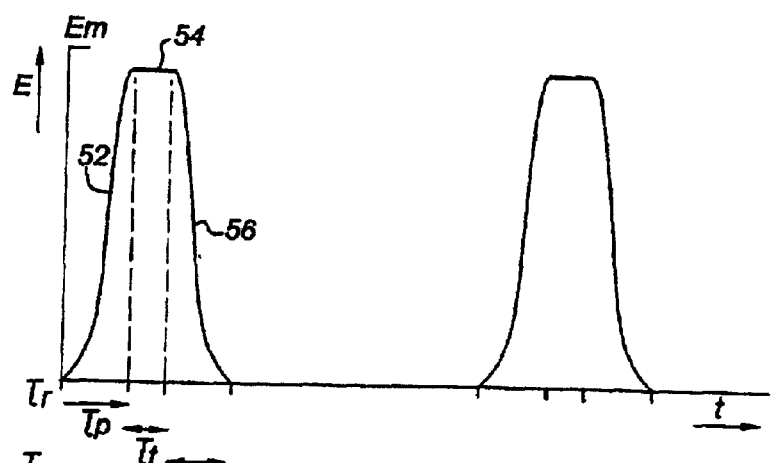
FIG. 2a illustrates schematically a pulse series applied in a typical PEF process.

In FIG. 1a a product is positioned between the plates 10, 12. The product may for instance be transported and loaded in the device by a conveyor belt 17. In FIG. 1b there is contact between the plates 30, 32 and the conduit 34. The conduit is part of the device. It is supposed that this conduit is made of electrically insulating material. For treating the product 16 respectively 36 the source 22 respectively 42 provides high voltage pulses with a properly defined rise time and peak voltage. An example of a suitable pulse cycle is illustrated in FIG. 2a. The illustrated pulses are characterised by a rising edge 52, a short section 54 at maximum voltage level and a trailing edge 56.

If a pulse with a proper rise time is supplied to a capacitor configuration as illustrated by FIG. 1a or 1b an electric field is generated instantaneously within the product by means of molecular polarisation. Momentarily an electrical field is present within the product. This will induce an ion migration process within the product to be treated. Therefore, an electrical field due to DPP can exist only temporarily. After a time period $\tau$ this field will be eliminated by the ion displacement. At this point the electrical field within the product is cancelled. This short period of time, also known as the relaxation time, is dependent on the electrical conductivity $\sigma$ of the product and the dielectric constant $\in$ according to: $\tau = \in/\sigma$.

In case the externally imposed voltage pulse has a rise time which is shorter then the above-mentioned relaxation period the molecular polarisation will temporarily cause an electric field across the product and therewith across the biological cells within the product. If the strength of this induced field is sufficient, this probably leads to damaging of membrane structures present. Due to the non-stationary nature of this mechanism the time dependence has to be considered. In this situation no stationary electric current is exploited as in the case of the PEF process.

Heat Dissipation

An amount of heat will be developed as result of dielectric losses caused by molecular rotation and ionic losses. As pointed out previously, the rise time $\tau$ of the imposed pulse illustrated in FIG. 2a has to fulfil the requirement $\tau r < \tau$. The top section of the pulse is preferably selected very small to avoid any further migration process as soon as the maximum voltage level is reached. That implies that preferably the sum of the periods $\tau r$ and $\tau p$ has to be smaller than $\tau$.

Apart from the rise time, the maximum voltage level Vm obtained at the end of the rise time has to be selected as well. This level is dependent on the type of product, kind and tickness of packaging materials and the configuration of the treatment device. In general, the peak voltage should be such that a sufficiently high electrical field strength is reached inside the product under consideration. Typically field strengths in excess of 1 kV/cm should be employed. The number of polarisation cycles needed and the time lag between them depends on what energy input is required and what the maximum temperature is that during the process can be allowed. In practice not one but a larger number of pulses will be needed to obtain a more intense treatment.

Figure 2B:
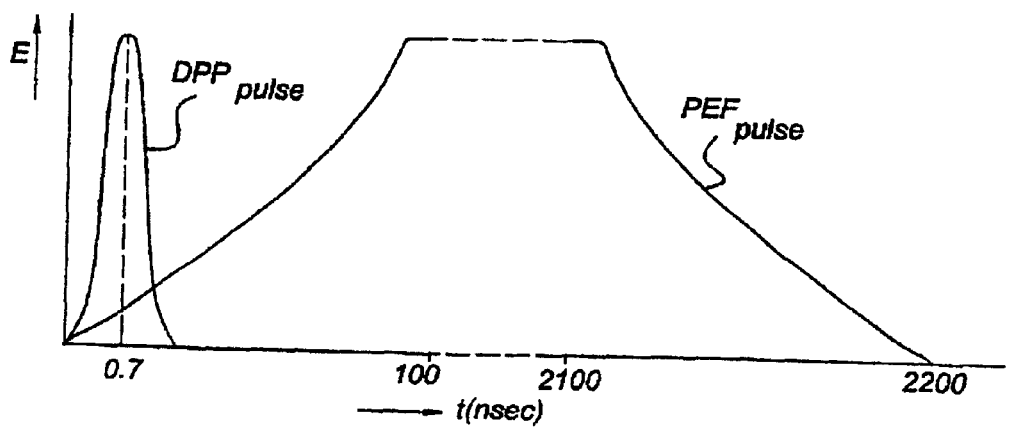
FIG. 2b illustrates schematically a pulse series applied in a process according to the invention.

To clearly indicate the difference in the pulse characteristics used in the PEF process on the one hand, and the process according to underlying application on the other hand FIG. 2b is added. On the same time axis a typical PEF pulse and a typical DPP pulse are illustrated for the treatment of an assumed high water content product with a electrical conductivity of 1 S/m. The following values are typically required:

|  | PEF | DPP |
| --- | --- | --- |
| rising edge | 100 nsec | 0.7 nsec |
| steady state | 2000 nsec | <0.7 nsec |
| trailing edge | 100 nsec | <0.7 nsec. |
| maximum imposed electrical field strength (inside product) | 30 kV | 30 KV |

DPP in Practice

In a practical test the method discussed in this application was exercised by stopping the lactic acid production by Lacto bacilli strains. In foodstuffs this kind of organisms are known to cause spoil food during storage by acidification, thereby limiting the shelf life during storage. A small amount of fresh yoghurt, dissolved in demineralised water, was used as a model product. The inoculation of the samples was approximately 10e5 organisms per millilitre at a pH=7.0. The conductivity of the inoculated buffer was such that a relaxation time in excess of 100 ns was obtained for one part of the batch and a relaxation time of much less than 100 ns for a second part of the batch. The two different stocks of model product were distributed over 64 bags, made out of plastic film bags (Stomach). The tickness of the bags was 100 micrometer and the permittivity of the material is 270 nF/m. The bags were hermetically sealed allowing a minimal head space of air as a result of the sealing procedure. Part of this batch was non-treated as a reference, a second part was treated by conventional heat (pasteurised) at 80 degrees centigrade for 10 minutes. A third part of the batch was treated at different DPP conditions and at intensity levels. This included the cases where either the conditions where $\in/\sigma$>pulse rise time and $\in/\sigma$<pulse rise time. In other words, several different control experiments have been taken into account to evaluate the validity of the claims in this patent application.

A custom-made high voltage power supply was used to produce voltages cycles over more than 15 kV within 100 ns. In the demonstration set-up the film bags where provided with adhesive aluminium foil at the outer side. The film bags loaded into a device similair as described in FIG. 1a. Note that as the bags are made out of plastic, which is an good electric insulator, no charge can flow through the product.

After treatment the samples were added to a sterile sample of milk at pH 7.0 which were incubated at 40 degrees centigrade for 12 hours hereafter. After this time, the pH of the samples was measured to check whether acidification had occurred or not. A reading of pH<5.0 was considered as acidified or spoiled whereas levels of pH>6.8 were considered as non-spoiled. The result of these treatments can be found in table 2. In case of the non-treated samples all of the 17 samples demonstrated spoilage. For the chosen level of pasteurisation 16 bags out of 23 where successfully heat pasteurised. For 7 bags spoilage could be demonstrated indicating that some Lacto Bacilli survived pasteurisation at this temperature-time combination. For the DPP processed bags the electric field strength of the treatment have to be sufficient intense as well as the total treatment time. The total treatment time is defined by the relaxation time multiplied by the number of voltage cycles employed. Furthermore, the necessity of the required condition that $\in/\sigma$>pulse rise time is demonstrated. In treatment G in table 2, the proper conditions where found to completely stop the acidification. In this case 8 out of 8 treatments has led to a full suppression of the spoilage. This was achieved at a maximum product temperature of 40 degrees centigrade. In addition, the total processing time needed is much less than the required time for heat pasteurisation at 80 degrees centigrade.

As show in table 1, in all cases the temperature increase was restricted to small values which in general are not obtainable with prior art methods.

Table 1 Measured temperature increments for various treatments. The ambient temperature was 20 degrees centigrade.

| Treatment | Treatment Period (ms) | Field strength (kV/cm)* | Temperature Increase (° C.) |
|---|---|---|---|
| A | 2 | 20 | 0.5 |
| B | 20 | 20 | 1.0 |
| C | 200 | 20 | 8.5 |
| D | 200 | 25 | 18.0 |

(*) Within the product. This value is due to the instantaneous polarisation (DPP process) and is determined by finite element analysis modelling of the total system. The field strength is evaluated at the maximum applied voltage.

In table 2 the inactivation of Lacto Bacilli in sealed bags and treated with the DPP process is compared with a conventional heat treatment:

TABLE 2

| Treatment (time) | relaxation time of product | E (kV/cm)* | number of bags | % acidified |
|---|---|---|---|---|
| None | <>100 ns | — | 17 | 100% |
| heat pasteurisation | <>100 ns | — | 23 | 30% |
| E (2 ms) | <>100 ns | 20 | 4 | 100% |
| F (200 ms) | <>100 ns | 13 | 12 | 100% |
| G (200 ms) | >100 ns | 20 | 8 | 0% |

(*) Within the product. This value is due to the instantaneous polarisation (DPP process) and is determined by finite element analysis modelling of the total system. The field strength is evaluated at the maximum applied voltage.

Characteristics

In the following the typical characteristics of both PEF and DPP are shortly resumed:

In a typical PEF process pulses of the type illustrated in FIG. 2b are applied. During a PEF-treatment the product to be treated is in contact with two conducting electrodes which are connected to a pulsed power source. By means of said power source an stationary electric field is imposed according to $j=\sigma$. Typically the pulses, applied to said electrodes are maintained for some microseconds. Under these conditions a stationary situation is obtained in terms of the electric parameters current and voltage. That is an electric current density by movement of charge is required to sustain a net electric field. This is by transport of e.g. ions dissolved in the product which are dragged to the product during the actual treatment.

One or more of the beneath indicated characteristics are typical for PEF-treatment:
(1) there is a continuous supply of electric current during the pulse. This current is delivered by a capacitor in an electronic pulse circuit whereby a so-called pulse-forming network (PFN) may be used to maintain the voltage across the treatment device constant while the discharging the capacitor. If no PFN is applied the voltage will decay exponentially in time. The time constant RC of this decay is related to the capicity (C) of the charged capacitor and to the ohmic resistance R of the electronic circuit;
(2) the electronic circuit supplies a peak power which can be related to $P=\sigma E^2 V$ whereby E is the spatial average of the field strength applied, s the electric conductivity of the product and V is the total volume of the product being treated;
(3) the pulse is preferably of rectangular shape, in other words: the voltage is kept to a constant level during the duration of the pulse;
(4) a typical pulse duration of some microseconds is applied;
(5) the electrodes are in physical contact with the medium to be treated;
(6) the average dissipated power <P> is give by $<P>=sE^2 tj$ whereby t is the total treatment time and j is the product throughput.
(7) the heat development in the PEF process is determined by Ohmic heating and is given by <P>=<U><I>, wherein <U> and <I> are respectively the time averaged voltage and the time averaged electric current of the imposed pulse shape. The total current as such is determined by the current density $j=\sigma E$ and the cross sectional area of the surface through which said current is measured.

For a description of the Dynamic Polarisation Process (DPP) according to the invention, the above-mentioned simplification that the current density goes beyond the time-independent, stationary state approximation given by $J=\sigma E$. Instead, we have to take into account all of the so-called Maxwell equations and allow time dependent polarisation effects. In this case the current density is given by:

$$j=\sigma E+dD/dt$$

where the dD/dt term is the time derivative of the molecular displacement field. D is related to the static polarisation vector of a dielectric medium with permittivity $\in$, by:

$$D=\in E.$$

In the above indicated applications of systems based on PEF treatment the second term in the equation is considered to be zero. At the pulse conditions where PEF systems operate in practise this is a valid assumption. However, in underlying application use is made of the action relying by the second term, i.e. dD/dt. It can be proven that with rapidly varying voltages through a capacitive coupling only the second term of the above mentioned equation is significant for a predetermined microbial effect. In contrast to the conducting current in the PEF-process, the displacement current in underlying application is only a reactive current which is present only temporarily after the initial polarisation of the medium.

The method according to the invention is now characterised by a number of the hereafter indicated characteristics:
1. the change of an the external imposed voltage generates an electrical field between two-capacitor plates which causes an temporarily voltage gradient across the product and across any present membrane structure;
2. the maximum of the imposed voltage should be sufficiently high to cause micro-biological inactivation. Typically field strengths are employed in excess of 1 kV/cm.
3. the external voltage has to imposed within a time interval smaller than the dielectical relaxation time of the product given by its electrical conductivity and permittivity by $\tau=\in/\sigma$,
4. the heat that is dispositied in the product as a result of the polarisation-depolarisation cycles determined by the number of times the medium is polarised. In general, the energy density in a polarised medium is given by $u=\frac{1}{2}\in E^2$. After each cycle of polarisation and depolarisation this equals the maximum energy contents which can be converted into heat. In case that a continuous wave (CW) oscillator of frequency $\omega$ is facilitated as the external voltage source, the heat dissipation per unit volume is determined by:

$$p=\tfrac{1}{2}\omega\in\in''E^2, \text{ where } \in'' \text{ is the so-called dielectrical loss factor.}$$

5. the heat development is caused primarily by the counter acted rotation (friction) of polar molecules and ions in the medium to be treated. For radio frequencies (RF) in the range of 1 to 1000 MHz these kind of losses are relatively small, for microwave (MW) frequencies in the range of 1–4 GHz these losses can be significantly.

By applying the method according to the invention products containing micro-organisms and membrane structures can be treated in a completely different manner. It has been demonstrated that this method in principle can be used do stop bacterial spoilage at reduced temperatures and treatment times. An example of the performance of this novel method has been demonstrated and has been compared to a standard heat process (pasteurisation) that is commonly used by food manufactures and the pharmaceutical industry as a preservation method. The novel method can be applied as a mild preservation method for pre-packed products and has potential as a mild decontamination method of in shell eggs. Although this method has been evaluated for a pre-packed product, it is also applicable as an continuous process on a flow of bulk produce. To generalise its application: the method relies on dynamical polarisation cycles, induced by means of an external time dependant voltage source with specific requirements on the steepness of the rising edge of the imposed voltage shape rather than the duration of the imposed voltage. The basic differences between the dynamic polarisation processes according to underlying application and the prior art PEF-method are:

- use is made of a non-stationary electronic processes to generate an electrical voltage difference across a product;
- the coupling with the medium to be treated is capacitive;
- in principle no electrodes in physical contact with the product are required.

In contrast to the PEF-technology, the process according to underlying application functions in principle with cycles of continuously oscillating electrical fields. These can be applied by using electronic circuitry operating at a single resonant frequency. This is fundamentally different from the types of electronic circuitry employed in the PEF technology, where switches and PFN's have to be are operated over a spectrum of frequencies to obtain an electrical pulse.

What is claimed is:

1. Method for treating a product, which contains cellular material of eukaryotic or prokaryotic origin, which comprises:

bringing the product in a treatment device comprising two electrodes connected to an electronic circuit;

creating an electrical field pulse in said product;

wherein a rise time or leading edge of each imposed voltage pulse is shorter than an associated electronic relaxation time of the product under treatment;

said electronic relaxation time being defined by the ratio of electrical conductivity and permittivity of the product.

2. The method according to claim 1, wherein cellular structures present in the product are pathogenic or spoilage organisms, or spores, and treatment is applied as a mild preservation method to prevent the outgrowth of such organisms in the product after production during distribution or storage.

3. The method according to claim 2, wherein the cellular structures have membranes, and the product contains target compounds selected from the group consisting of minerals, enzymes and molecular compounds which are exchanged at a higher rate through the membranes of the cellular structures when applying the treatment.

4. The method according to claim 1, wherein each electrical field pulse has a duration shorter than the relaxation time of the product.

5. The method according to claim 1, wherein the dependent on the type of product and target organisms contained in the product, the maximum field strength during a cycle, the repetition frequency and the number of cycles during a treatment are selected such that the target organisms are functionally affected or inactivated leading to a microbiologically safe product having a stable shelf life.

6. The method according to claim 1, wherein dependent on the type of product and target cells contained in the product, the maximum field strength reached in a cycle, the repetition frequency and the number of cycles during a treatment are selected such that the target cells are functionally affected, not necessarily inactivated, leading to an enhanced exchange of intracellular compounds with the product.

7. The method according to claim 1, wherein the maximum field strength in the product during each pulse, the repetition frequency, the number of cycles and the total residence time of the treatment are selected such that the temperature of the product does not exceed a predetermined value during treatment.

* * * * *